(12) United States Patent
Li et al.

(10) Patent No.: US 12,585,176 B2
(45) Date of Patent: Mar. 24, 2026

(54) BENDABLE CAMERA-SUPPORT ROD SYSTEM

(71) Applicants:Gui Li, Bradenton, FL (US);
Chunyang Jiang, Bradenton, FL (US)

(72) Inventors: Gui Li, Bradenton, FL (US);
Chunyang Jiang, Bradenton, FL (US)

( * ) Notice: Subject to any disclaimer, the term of this patent is extended or adjusted under 35 U.S.C. 154(b) by 259 days.

(21) Appl. No.: 18/676,698

(22) Filed: May 29, 2024

(65) Prior Publication Data

US 2025/0370315 A1     Dec. 4, 2025

(51) Int. Cl.
*G03B 17/56* (2021.01)
*F16M 11/40* (2006.01)
*F16M 13/02* (2006.01)

(52) U.S. Cl.
CPC ........... *G03B 17/561* (2013.01); *F16M 11/40* (2013.01); *F16M 13/022* (2013.01)

(58) Field of Classification Search
CPC ............... G03B 17/561; F16M 13/022; F16M 2200/00; F16M 13/00; F16M 11/40
See application file for complete search history.

(56) References Cited

U.S. PATENT DOCUMENTS

2008/0265111 A1* 10/2008 Darrow ................ G03B 17/561
                                                        396/428
2011/0042530 A1*  2/2011 Phillips ................ G03B 17/561
                                                        248/121

* cited by examiner

*Primary Examiner* — Christopher E Mahoney
(74) *Attorney, Agent, or Firm* — Robert Brownstein

(57) ABSTRACT

The invention herein disclosed is a bendable camera-mount rod system with a surface-engaging pad-food end fixture on one end, and a camera-mount end fixture on an opposite end. A camera may be mounted to the camera-mount end fixture, and the pad-foot end fixture is placed such that it engages a floor or surface. By holding the bendable camera-mount rod system essentially vertical with the pad-foot end engaged with a floor or surface, unintended camera motion is suppressed. By bending the bendable portion of the invention, the height may be lowered while maintaining untended motion suppression.

6 Claims, 7 Drawing Sheets

100

102

101

103

201

202

100

701

BENDABLE CAMERA-SUPPORT ROD SYSTEM

TECHNICAL FIELD

The invention is a rod used to support a camera to minimize camera motion during image capture.

BACKGROUND OF INVENTION

From the earliest days of photography, it was known that movement of the camera during exposure can cause image blurring. The earliest cameras, which required lengthy exposure time, were all mounted on support systems that rested on a floor or surface minimizing camera motion during exposure.

Today's image-capture systems are nearly all electronic. That is, an image produced by a lens is projected onto an image sensor made up of myriad picture elements (pixels). The exposure time is often fractions of a second. But, camera movement can cause blurring, and even motion-compensation subsystems cannot compensate for abrupt, significant motion.

Camera tripods are available with standard-mount fixtures on top and three legs that spread out from the fixture providing a firm camera support. Often, the legs are comprised of telescopic elements that can be extended, retracted and locked into position to provide adjustable heights. Smaller tripods designed for small webcam image-capture systems may also be supported by smaller tripods. Here, using goose-neck technology for the legs, the legs may be bent so as to adjust the height and for camera leveling.

Goose-neck technology for bendable legs work well with smaller tripods but are felt unsuitable for larger ones. As such, the non-bendable, telescoping-element legs are used exclusively. Where a camera is to be moved frequently, and must be quickly supported, a single telescoping leg with camera-mount fixture may be used for greater expediency. Unlike a tripod, though, a user must maintain a hold on the support because it will not be self-standing.

With an alternative bendable-rod technology, a single-rod support may be implemented that avoids telescoping/locking elements while providing the height adjustability and simplicity of the smaller tripods.

BRIEF DESCRIPTION OF INVENTION

The invention herein disclosed and claimed is a bendable camera-support rod that uses a bendable rod comprised of stranded- and solid-wire elements rather than the goose-neck type structure.

It is well known that with goose-neck structures, where bending and unbending is frequent, and focused on the same section of arm, these goose-neck substructures will weaken and become flaccid, unable to maintain an unbent orientation. With a wire-based structure, such frailties are not inherent. Such structures may be bent and unbent frequently, at any position on the arm, and suffer no weakness.

The bendable camera-support rod is comprised of the bendable rod plus specialized fixtures at each rod end. One fixture is specific to standard camera mount interface; the other fixture features a pad-foot which rests against a surface providing protection against surface scratching and lateral motion resistance.

The bendable rod is comprised of a solid-wire core wrapped by a plurality of stranded-wire cables. Cable material and dimensions are not critical but must be chosen so as to support the largest expected camera payload.

DETAILED DESCRIPTION OF INVENTION

To capture still images with minimal distortion, it is important that the image-capture system be free of motion during exposure, and to capture motion images with minimal jitter, it is important that the image-capture system be free of vertical motion during image capture.

Tripods featuring stiff, telescoping-element legs can be used to reduce unwanted motion. Single rods featuring a stiff, telescoping element leg are more easily carried, and readied, but are not free standing.

The invention herein disclosed is a bendable camera-support rod system that provides the benefits of a single-rod support while making height adjustment easier and faster than unlocking, extending/retracting, and relocking a stiff telescoping leg support system.

In place of a leg comprising two or more telescoping elements and locks, this invention uses a bendable-rod subsystem comprised of solid- and stranded-wire cable components.

Before assembling the system, the bendable rod is sheathed inside a flexible, protective sheath. Each end of the bendable-rod subsystem is then interfaced to an end fixture specialized for either camera mounting or floor/surface engagement.

Once fully assembled, the end fixture for camera mounting interfaces with a camera mount structure using well-known and standard interface structures.

Next, the camera-mount fixture, attached to a camera-mount structure may then have a camera attached. The bendable camera-mound rod with attached camera is now ready for still or motion image capture while providing substantial resistance to unwanted camera motion.

To make it easier to visualize the invention, the following figures and descriptions describe one embodiment.

Figure 1:
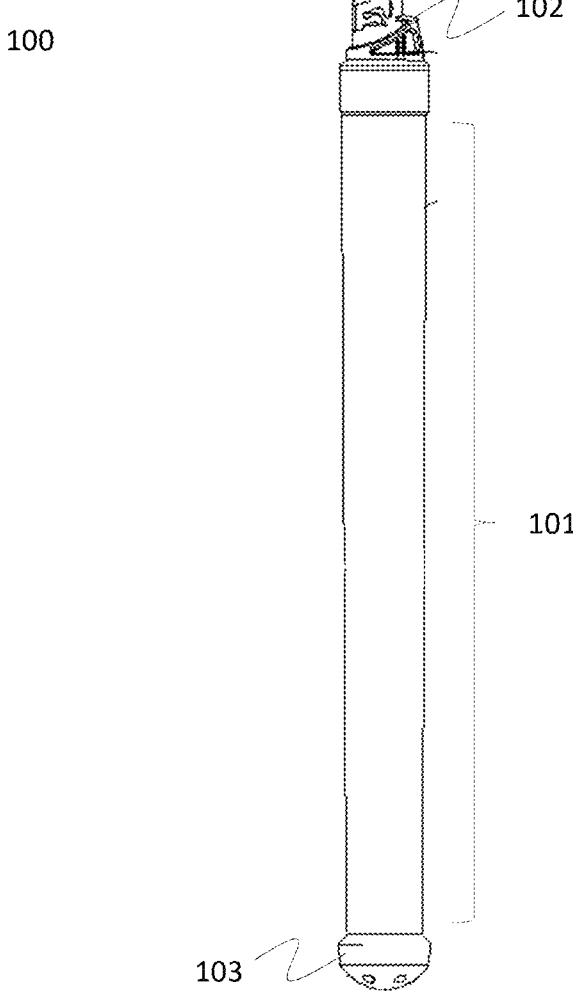
FIG. 1 illustrates the fully assembled bendable camera-support rod. It is not drawn to scale.
Figure 2:
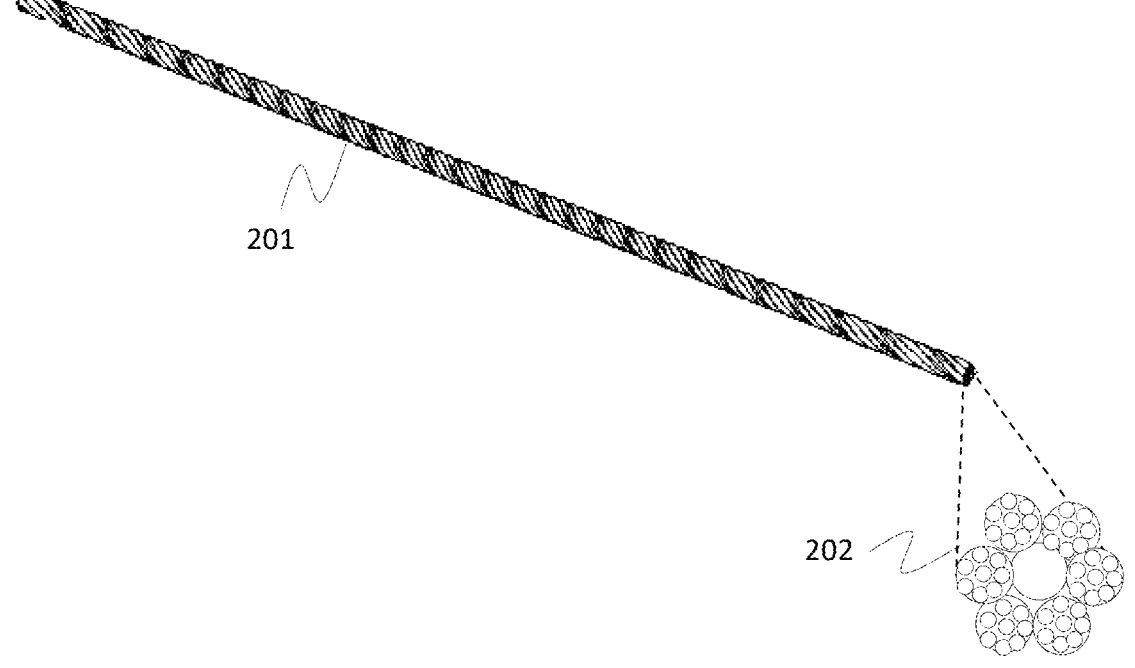
FIG. 2 illustrates the wire-base bendable rod and an end view. It is not drawn to scale.

The assembled bendable camera-mount rod system (100) is shown in FIG. 1. The bendable rod portion is 101, the camera-mount end fixture is 102, and the pad-foot end fixture is 103.

The bendable rod portion comprises a solid-wire central core wrapped by a plurality of stranded-wire cabling (201). An end view of the bendable rod portion is shown as 202.

Figure 3:
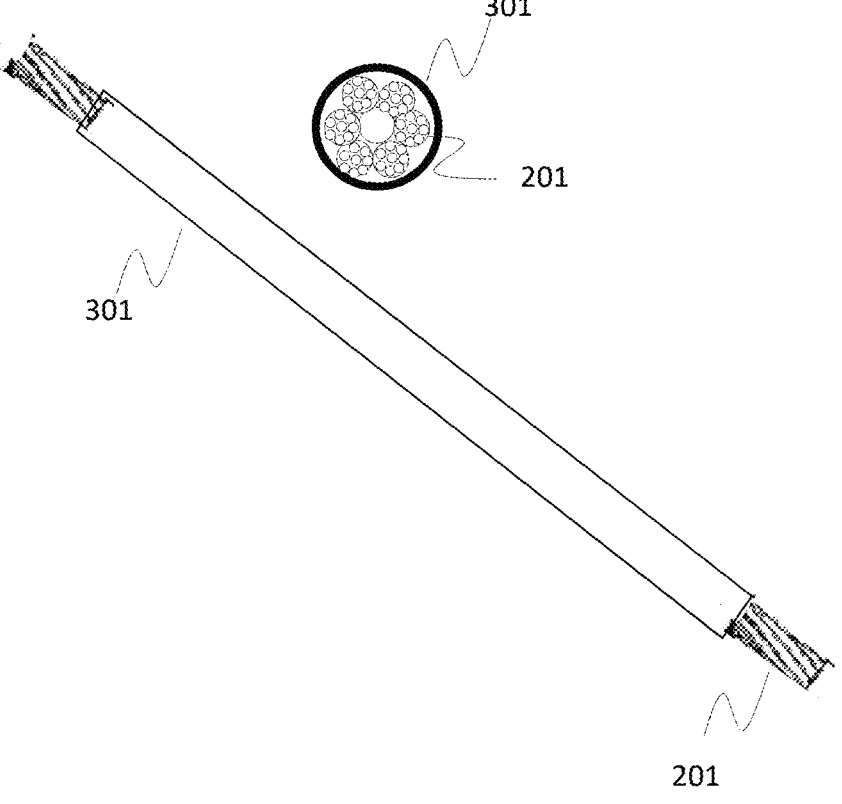
FIG. 3 illustrates the rod of FIG. 2 inside a protective sheath. It is not drawn to scale.

As shown in FIG. 3, the bendable rod portion (201) is sheathed within a sheath (301). The figure shows a perspective view and an end view.

Figure 4:
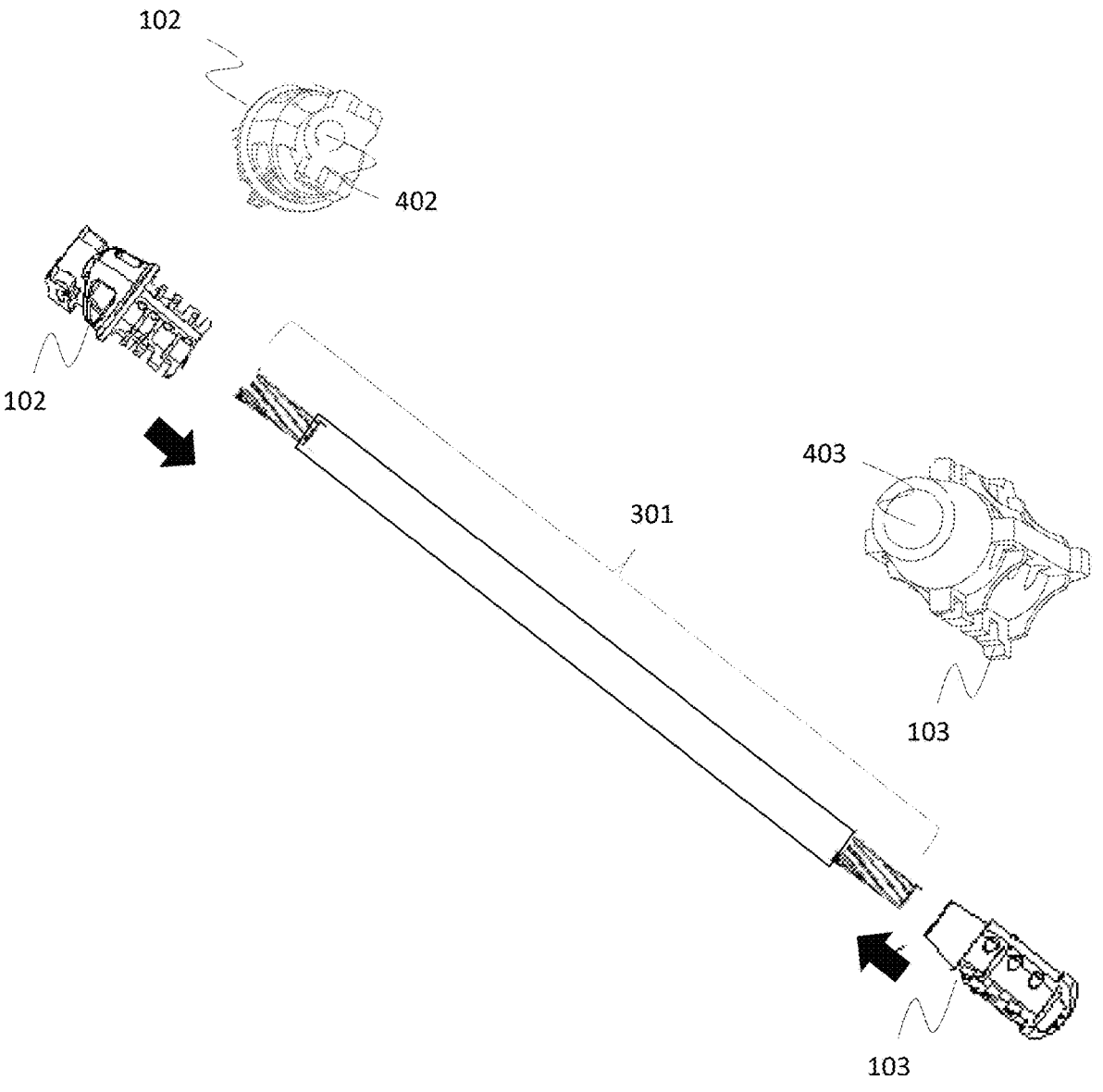
FIG. 4 illustrates the specific end fixtures, one for camera mount, one for surface footing. The end fixtures each have a clamping fixture forming an aperture into which the rod ends are inserted. It is not drawn to scale.

FIG. 4 shows all the components of the bendable camera-mount rod system preassembled. The camera-mount end fixture (102) has an aperture (402) associated with a clamping structure. The pad-foot end fixture (103) has an aperture (403) associated with a clamping structure. The end fixtures 102 and 103 are to be interfaced to their respective ends of the bendable-rod subsystem (301) by inserting each end into its respective aperture.

Figure 5:
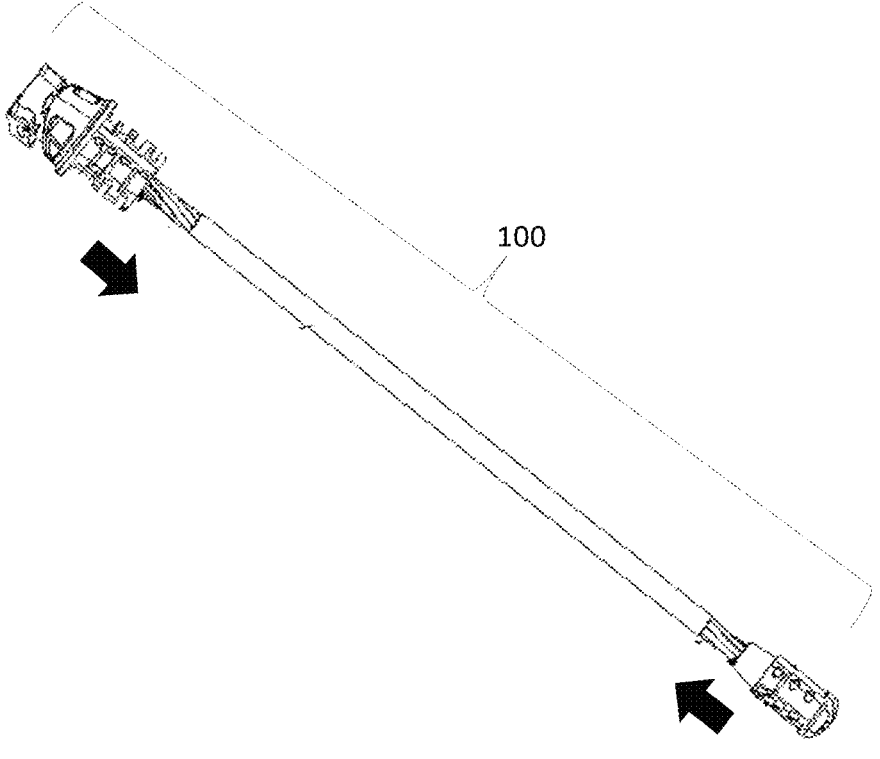
FIG. 5 shows the end fixtures interfacing the rod ends after which the clamping structures on each fixture is tightened so as to establish a firm interface free of sliding or rotation. It is not drawn to scale.

As shown in FIG. 5, as each end fixture is interfaced to its respective end, each end fixture is moved into position and the clamping structures are tightened so as to prevent sliding or rotation of the end fixtures relative to the bendable-rod subsystem ends.

Figure 6:
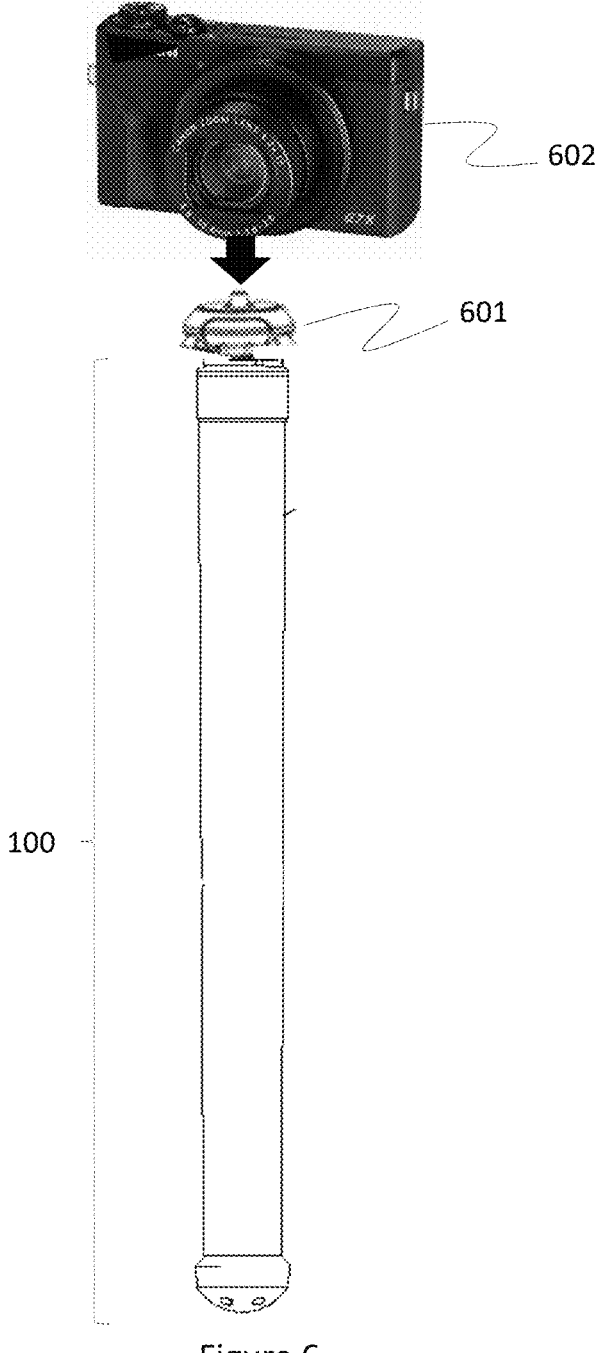
FIG. 6 shows the fully assembled rod interfaced to a standard camera mount structure upon which a camera is then mounted. It is not drawn to scale.

In FIG. 6, the fully assembled bendable camera-mount rod system (100) is interfaced to a camera-mount fixture (601) which can then be interfaced to a camera (602).

Figure 7:
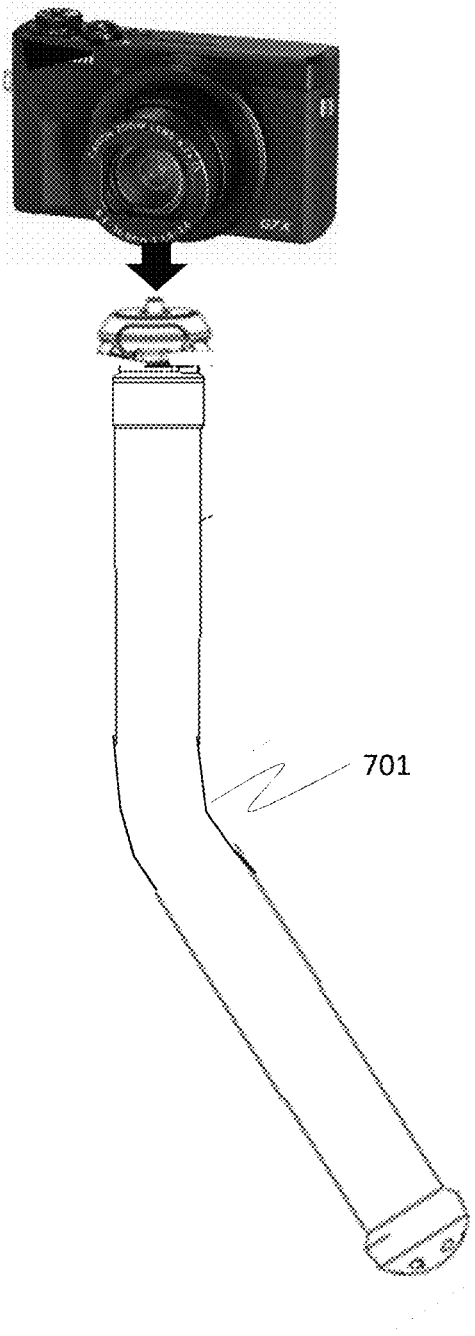
FIG. 7 illustrates how the figure of FIG. 6 is bent so as to lower its height somewhat. It is not drawn to scale.

Rod height may be adjusted, as shown in FIG. 7, by bending the rod (701) at any point along its length.

The wire used in the bendable-rod subsystem is metallic each strand having characteristics that allow bending and retention of the position once bending has stopped. The solid-wire central core component is metallic having characteristics that allow bending and retention of the position once bending has stopped.

The sheath covering the bendable-rod subsystem is tubular and made of flexible material whose characteristics are flexibility, elasticity and conformance with the contours of the bendable-rod subsystem both before and after bending has stopped.

The camera-mount end fixture is metallic.

The pad-foot end fixture is metallic and is inserted into a tightly fitting rubber or synthetic pad foot. The pad-foot surface is operative to provide a non-slip frictional interface between it and any surface to which it is engaged.

The figures and description are for an embodiment of the invention and should not be read as limiting the scope of the claims.

What is claimed is:

1. A bendable camera-support rod system comprising:
   a bendable rod comprising:
      a plurality of stranded-wire cables; and
      a central solid-wire core cable;
   a sheath covering the bendable rod;
   a camera-mount end fixture; and
   a pad-foot end fixture.

2. A claim as in claim 1 wherein the plurality of stranded-wire cables are individually wrapped around the solid-wire core cable.

3. A claim as in claim 1 wherein the sheath is tubular and coaxial with the bendable rod and tightly covers the bendable rod.

4. A claim as in claim 1 wherein the camera-mount fixture has an interface comprising a clamping structure that fits over one end of the bendable rod and is tightened so as to make a firm attachment wherein the camera-mount fixture cannot slide or rotate in relation to the one end inserted into the clamping structure.

5. A claim as in claim 1 wherein the pad-foot end fixture has an interface comprising a clamping structure that fits over one end of the bendable rod and is tightened so as to make a firm attachment wherein the pad-foot fixture cannot slide or rotate in relation to the one end inserted into the clamping structure.

6. A claim as in claim 1 wherein the camera-mount fixture is interfaced to one end of the bendable rod, and the pad-foot fixture is interfaced to an opposite end of the bendable rod.

\* \* \* \* \*